United States Patent [19]

Waymire et al.

[11] 3,708,393
[45] Jan. 2, 1973

[54] RADIAL RESTRAINT MECHANISM FOR REACTOR CORE

[75] Inventors: Gary R. Waymire, Richland; John F. Lubeck, Kennewick, both of Wash.

[73] Assignee: The United States of America as represented by the United States Atomic Energy Commission

[22] Filed: Dec. 1, 1970

[21] Appl. No.: 93,993

[52] U.S. Cl. ................................. 176/40, 176/85
[51] Int. Cl. ................................... G21c 19/20
[58] Field of Search ............................. 176/85, 40

[56] References Cited

UNITED STATES PATENTS

| 2,998,370 | 8/1961 | Gaunt et al. | 176/85 |
| 3,100,188 | 8/1963 | Fraas et al. | 176/85 |
| 3,206,374 | 9/1965 | Lemesle et al. | 176/85 |

FOREIGN PATENTS OR APPLICATIONS

| 875,191 | 8/1961 | Great Britain | 176/85 |
| 854,144 | 11/1960 | Great Britain | 176/85 |
| 916,144 | 1/1963 | Great Britain | 176/85 |

Primary Examiner—Reuben Epstein
Attorney—Roland A. Anderson

[57] ABSTRACT

A system of laterally supporting fuel assemblies for a fast reactor in a tight-packed array during operation of the reactor includes mechanical linkages operated through concentric operating shafts by motors located at the top of the reactor enclosure to force pressure bars against the sides of the array of fuel and reflector assemblies in the reactor at several vertical locations and at six locations around the reactor. Provision is made within the mechanical linkage to allow for expansion of the reactor core due to thermal transients and to compensate for variations in applied load due to radiation induced creep and stainless steel swelling.

3 Claims, 5 Drawing Figures

Inventors
Gary R. Waymire
John F. Lubeck
Attorney

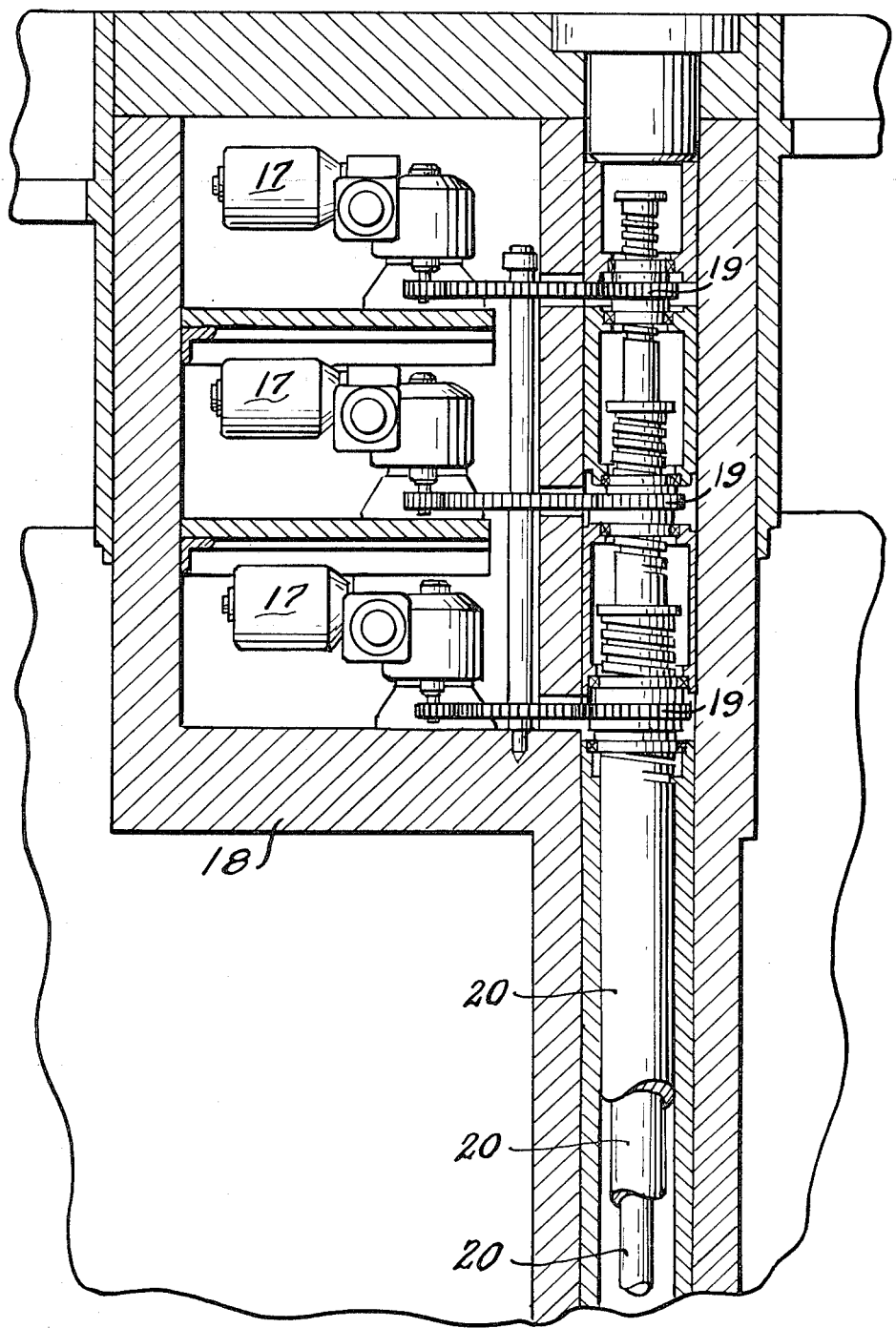

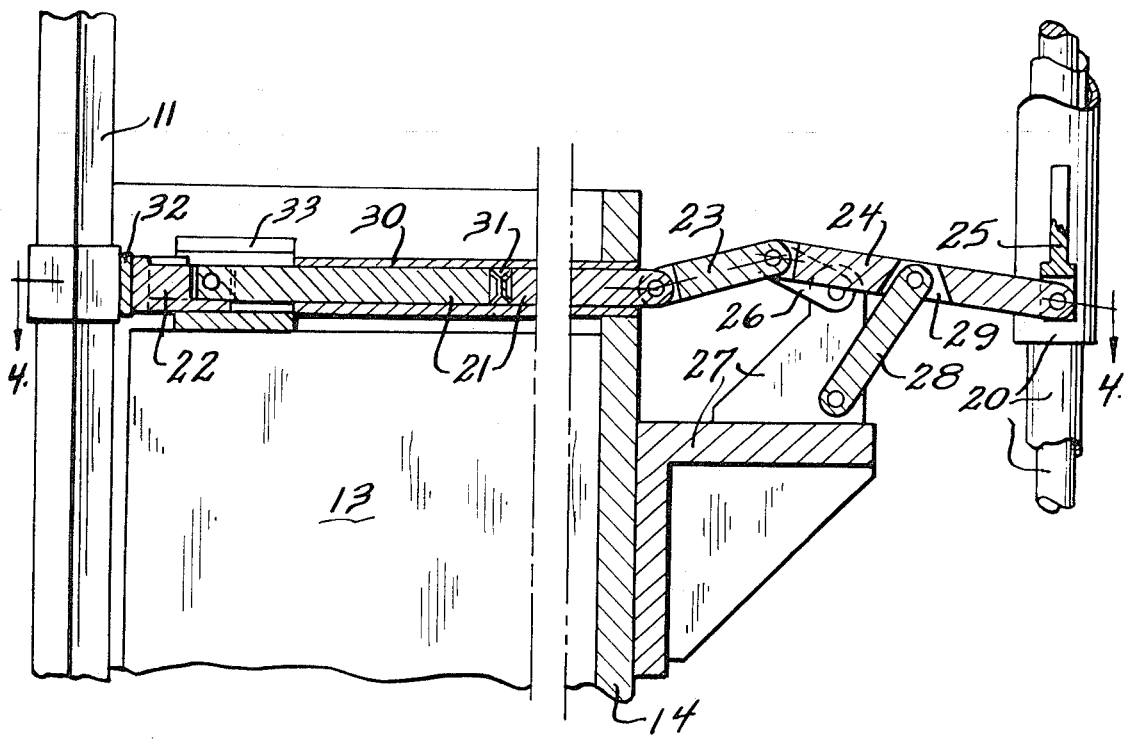
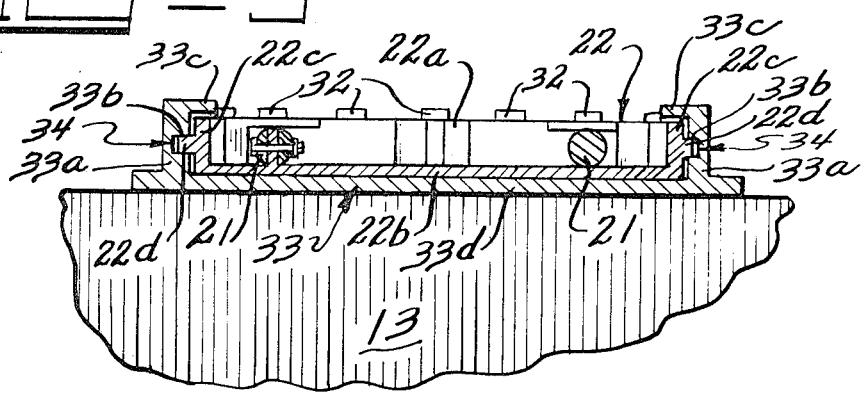

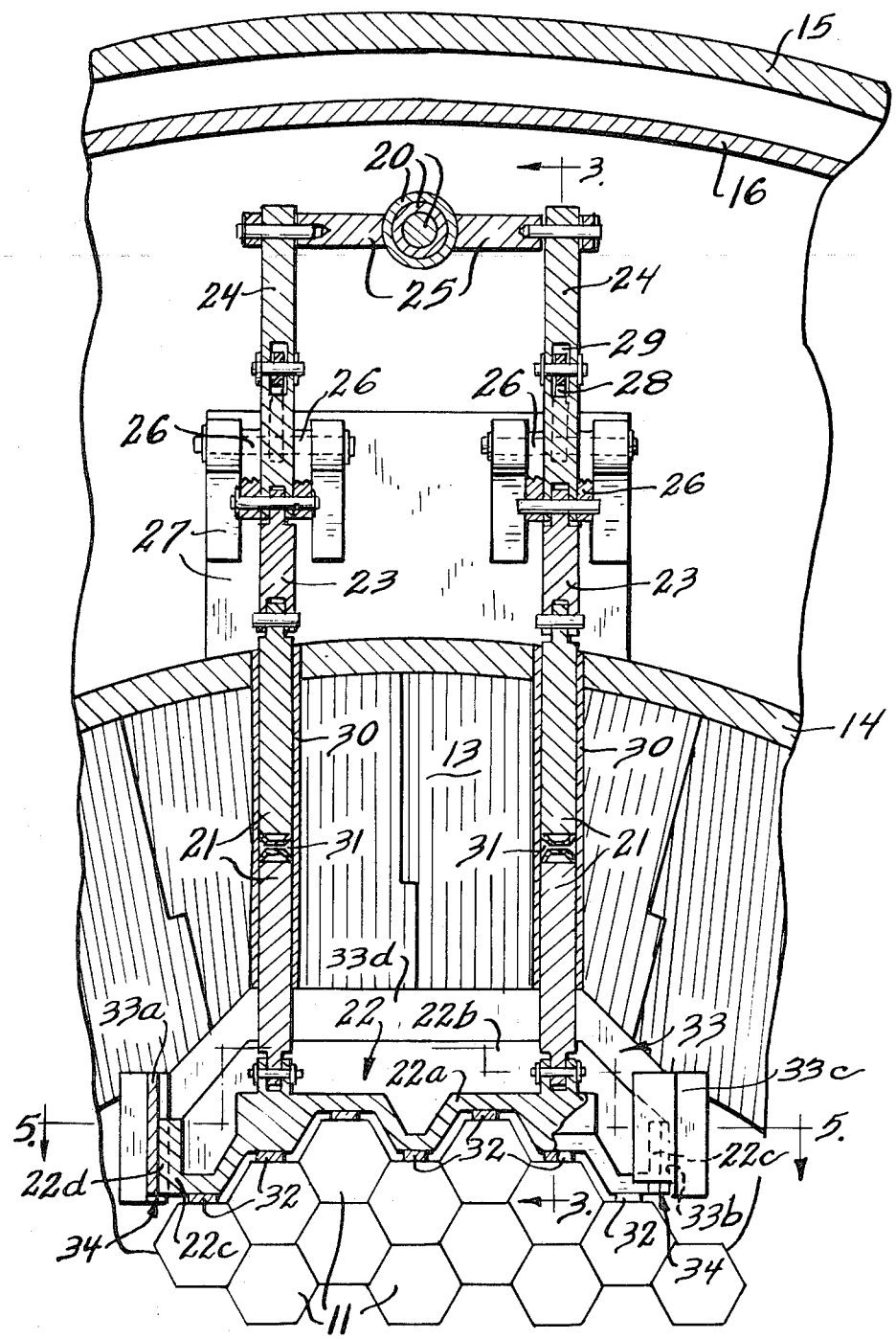
Fig—4

3,708,393

RADIAL RESTRAINT MECHANISM FOR REACTOR CORE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a system for tightly clamping together fuel assemblies during operation of a nuclear reactor which system may be readily released for refueling. In more detail the invention relates to such a system which includes compliant means for allowing expansion of the reactor core during thermal transients.

Past experience with fast reactor design has indicated that a system is required within the reactor to ensure stable positioning of the active core under all possible operating conditions. The effects leading to this need for a core lateral restraint include the inherent decrease in neutron flux as the radial distance from the core centerline is increased and a concurrent reduction in power profile and hence temperature from the core centerline outward. The need for such a system becomes particularly acute with the higher burnups and operating temperatures envisioned for fast reactors now being planned. These higher burnups lead to new phenomena which cause volumetric swelling and irradiation induced creep. While the fuel assemblies in the reactor core must be held together tightly during operation of the reactor, the clamping system must be released when refueling is necessary so that individual fuel assemblies can be withdrawn from the reactor core without damage to adjacent assemblies.

In addition to simply holding the core in a tight packed array during operation of the reactor, the restraint mechanism has several other functions which it must perform. These include:
1. Assist in reassembling the core
2. Provide compliancy during thermal transients
3. Assure that the applied load is not relaxed during operation due to radiation-induced creep.

During shutdown the core assembly clearance is increased from a contacting configuration to a relaxed, free-standing arrangement. When the reactor is started up again the fuel assemblies must again be in contact and in precisely the same position they were in before shutdown. Thus the restraint mechanism must assist in reassembling the core into the precise configuration desired.

Compliancy is required in the mechanism to prevent crushing of the ducts due to thermal expansion during thermal transients. The mechanism must therefore act as a girdle around the active core elements, applying a constant load with variable displacement.

Radiation induced creep and stainless steel swelling also are phenomenon which must be considered in designing the restraint system. The combination of creep and swelling can result in relaxation of load with resulting reactivity shifts. The core clamping device must therefore be designed with its primary load carrying member shielded from the main neutron environment. During the reactor cycle, the restraint system must compensate for the variations in applied load.

The requirement for compliancy and the desire to design against radiation effects are not complementary. To provide for compliancy the load should be fixed with variable displacement while the easiest way to design against creep effects is to provide a variable load, fixed displacement mechanism.

SUMMARY OF THE INVENTION

To achieve the above two conditions simultaneously a shielding member for carrying the major load is provided in the high radiation areas and a compliant or "springy" member is provided in a low radiation area. Specifically, mechanical linkages operated through concentric operating shafts by motors located at the top of the reactor enclosure are employed to force yokes against the sides of the reflector elements surrounding the core. A number of locations around the core are chosen so that the core is uniformly compressed toward its center. Means are provided within the mechanical linkage to allow for expansion of the reactor core due to thermal transients.

BRIEF DESCRIPTION OF THE DRAWINGS

The invention will next be described in connection with the accompanying drawing wherein FIG. 2 is an enlarged view of the upper portion thereof, FIG. 3 is a detail view showing the mechanical linkage through which the purposes of the present invention are attained.

FIG. 4 is a horizontal sectional view taken on the line 4—4 in FIG. 3 and

FIG. 5 is a detail sectional view taken on the line 5—5 in FIG. 4.

DESCRIPTION OF THE PREFERRED EMBODIMENT

Figure 1:
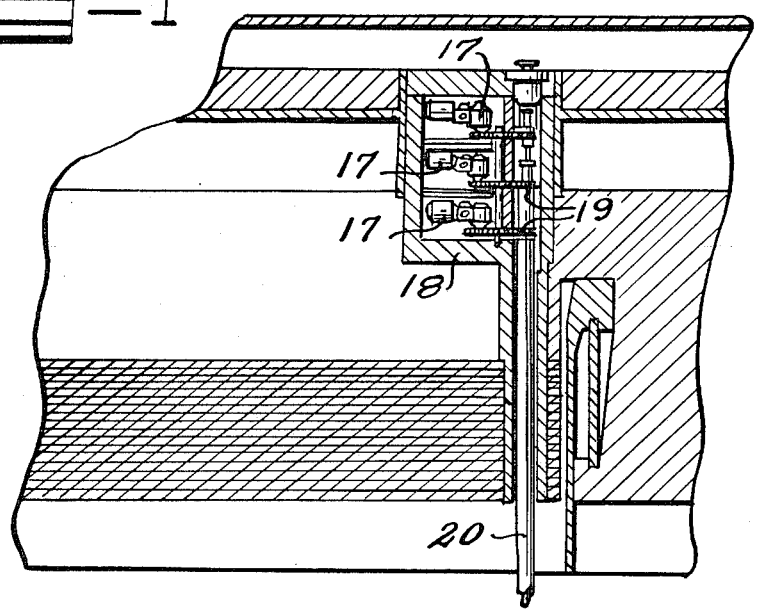
FIG. 1 is a vertical sectional view illustrating the present invention taken through a portion of a fast nuclear reactor.
Figure 1:
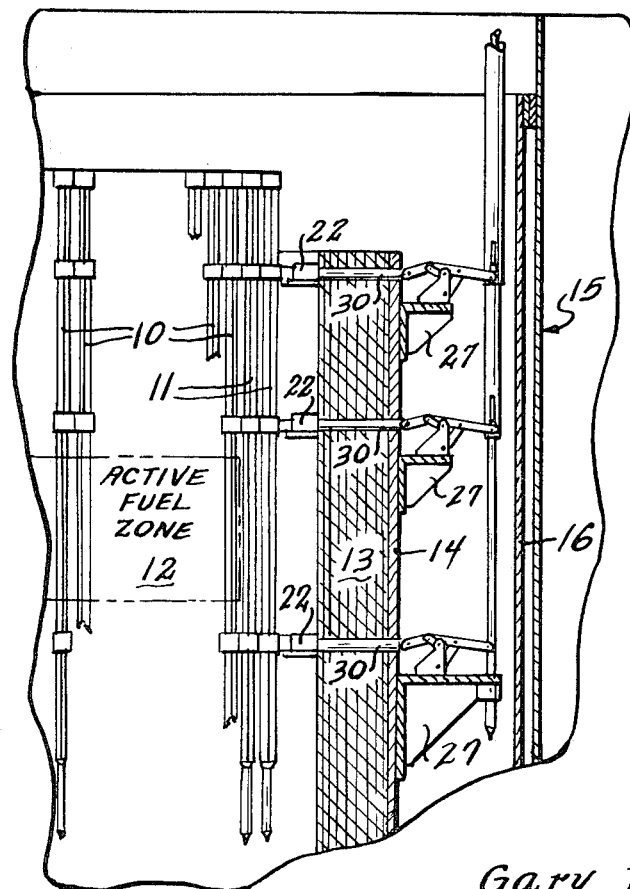

Referring now to the drawing, a fast reactor incorporating the present invention comprises a core consisting of a plurality of vertically disposed, hexagonal ducts 10 enclosing fuel and other reactor assemblies surrounded by hexagonal ducts 11 enclosing reflector assemblies. Active fuel zone 12 is disposed roughly midway of the length of the fuel assemblies. Shielding modules 13 surround reflector assemblies 11 and are in turn surrounded by a cylindrical core barrel 14 while a reactor vessel 15 —having a thermal liner 16 disposed thereinside— encloses the entire reactor. Thermal and biological shielding are supplied elsewhere in accordance with usual practice.

To accomplish the purpose of the present invention three motors 17 are disposed —one above the other— in a box 18 at the top of the reactor enclosure. These motors are each connected by means of a conventional ball-screw and gear arrangement 19 to the top of one of three concentric, vertically movable actuating shafts 20, the top motor operating the inner shaft, the second motor operating the next shaft, and the bottom motor operating the outer shaft. Actuating shafts 20 extend down into the reactor vessel 15 between core barrel 14 and the reactor vessel and are mechanically linked in a fashion to be described more in detail hereinafter to pairs of horizontal pressure bars 21 extending through core barrel 14. These are connected to the opposite sides of yokes 22 which bear on reflector elements 11 located at each of the six corners of the reactor and at three elevations, namely just below the active portion 12 of the reactor, just above the active portion of the reactor and near the top of reflector assemblies 11. These elevations are selected to achieve the desired reactivity effects based on thermal and flux profile. Yokes 22 are backed off about 0.8 inches to allow the ducts to move out against the stationary shield elements. As is of course apparent the outermost actuating shaft 20 is connected to the uppermost pair of pressure bars, the intermediate actuating shaft is connected to the middle pair of pressure bars, and the inner actuating shaft is connected to the lower pair of pressure bars. Sufficient concentric clearance is provided between the actuating shafts to assure the sodium oxide deposition cannot result in seizure between shafts.

The mechanical linkage between actuating shafts 20 and each of the horizontal pressure bars 21 will next be described. Two links —a shorter link 23 pivotally connected to the end of pressure bar 21 and a longer link 24 pivotally connected to the opposite end of link 23 and to a cross arm 25 extending out each side of actuating shaft 20— form a direct connection between actuating shaft 20 and pressure bar 21. One end of a pair of arms 26 are pivotally connected to the point of intersection of links 23 and 24 and the other end to the top of a bracket 27 which is mounted on core barrel 14. A single, longer arm 28 is pivotally disposed in a notch 29 in about the midpoint of link 24 and to a part of bracket 27 below the point of connection of arm 26. Arm 28 leans away from the core barrel and arms 26 lean toward the core barrel at a slight inclination from the horizontal. This series of linkages provides right angle motion from actuating shafts 20 to the yokes 22.

Pressure bars 21 are slidably disposed in sleeves 30 which extend inwardly from core barrel 14. Movement of actuating shafts 20 upwardly urges yokes 22 toward the center of the reactor core while movement downwardly releases this pressure. Pressure bars 21 are interrupted within sleeves 30 by a captive Belleville washer system 31 which provides the compliancy necessary to allow for thermal transients. Yoke 22 rides in a pressure bar slide 33 which is supported on the shield modules and may be included in a single unit with the sleeves for ease of removal. The pressure bar slide 33 in conjunction with the yoke 22 make up a tongue-in-groove combination 34 which allows lateral motion of yoke 22 with required guidance and details of these elements will next be described.

As will be noted in the drawing, yoke 22 is wide enough to bear on pressure pads 32 on several reflector assemblies 11, specifically seven in the embodiment shown in the drawing. Yoke 22 comprises a vertical pressure member 22a which bears against pressure pads 32, a trailing base plate 22b which provides rigidity for the structure and vertical side pieces 22c provided with projecting, outwardly facing horizontal ribs 22d. Pressure bar slide 33 comprises a pair of vertical guide members 33a each containing a horizontal, inwardly facing groove 33b with which ribs 22d are slidably engaged. Slide 33 also includes inwardly turned ledges 33c overlying side pieces 22c and a base plate 33d joining guide members 33a which may be and preferably is fastened to sleeves 30.

To operate the restraint mechanism to compact the core, actuating shafts 20 are raised by motor 17. This causes link 24 to swing about the pivot caused by its attachment to arm 28 lowering the pivot between links 23 and 24 thereby driving pressure bar 21 in against yoke 22. Link 26 guides the link 23 and provides an over-center locking feature to provide final location for the yoke 22.

To reassemble the array the various elevations of restraints are clamped in a preferred sequence i.e., opposite yoke at the lower elevation, followed by a similar sequence at the intermediate elevation and so on, using a wedging array so that the points of the overall hex pattern engage first, followed by smaller triangular loading patterns wedged into the initial across-points compaction.

By utilizing three separate actuating systems alternative methods are available for recompacting the core following refueling. This option allows an added versatility in selecting the best method for compacting the core assemblies.

The embodiments of the invention in which an exclusive property or privilege is claimed are defined as follows:

1. A system for laterally supporting fuel assemblies for a fast reactor in a tight-packed array during operation of the reactor comprising a plurality of yokes distributed uniformly around the reactor at several vertical locations, said yokes being shaped to conform to the outer configuration of the reactor and being wide enough to bear on a plurality of reflector assemblies which surround said fuel assemblies, and means for releasably forcing said yokes toward the center of the reactor comprising a pair of pressure bars riding in sleeves each containing a captive Belleville washer system, which bars apply pressure to opposite ends of the yoke, a plurality of concentric actuating shafts, a plurality of linkages providing right angle motion from the concentric shafts to the pressure bars, and means for raising and lowering said concentric shafts to releasably force the yoke against the reflector elements.

2. A system according to claim 1 wherein said yokes are disposed at locations just below the active portion of the reactor, just above the active portion of the reactor and near the top of the reflector assemblies.

3. A system according to claim 2 wherein said yoke comprises a vertical pressure member which applies pressure to the reflector assemblies, a trailing base plate which provides rigidity to the structure and vertical side pieces provided with projecting, outwardly facing horizontal ribs serving as the tongue of a tongue-and-tongue member and including a pressure bar slide comprising a pair of vertical guide members each containing a horizontal inwardly facing groove with which said ribs are engaged to form said tongue-and groove member, an inwardly turned ledge above said tongue-and-groove member and a base plate joining said vertical guide members.

* * * * *